United States Patent [19]

Pieczykolan

[11] Patent Number: 4,491,182

[45] Date of Patent: Jan. 1, 1985

[54] AUTOMATIC SPRINKLER

[75] Inventor: George S. Pieczykolan, North Wales, Pa.

[73] Assignee: Central Sprinkler Corporation, Lansdale, Pa.

[21] Appl. No.: 440,539

[22] Filed: Jan. 5, 1983

[51] Int. Cl.³ .............................................. A62C 37/08
[52] U.S. Cl. ..................................................... 169/38
[58] Field of Search ....................... 169/37, 38, 41, 42

[56] References Cited

U.S. PATENT DOCUMENTS

| 3,714,989 | 2/1973 | Gloeckler | 169/42 |
| 4,014,388 | 3/1977 | Anderson | 169/42 |
| 4,015,665 | 4/1977 | Simons et al. | 169/42 |

Primary Examiner—Andres Kashnikow
Assistant Examiner—Jon M. Rastello
Attorney, Agent, or Firm—Seidel, Gonda & Goldhammer

[57] ABSTRACT

An automatic sprinkler head is disclosed for the discharge of water for extinguishing a fire in which the delivery of water to and through the head is controlled by a fusible element to which heat is supplied by a plurality of vanes.

6 Claims, 4 Drawing Figures

AUTOMATIC SPRINKLER

BACKGROUND OF THE INVENTION

1. Field of the Invention

This invention relates to an automatic sprinkler head.

2. Description of the Prior Art

Various automatic sprinklers have heretofore been disclosed which are responsive to a fusible element, but none of these has proven wholly satisfactory.

SUMMARY OF THE INVENTION

An automatic sprinkler head is provided in which the discharge of the water to and through the head is controlled by a fusible element to which heat is supplied by a plurality of vanes.

It is the principal object of the invention to provide an automatic sprinkler head which is responsive to a fusible element.

It is a further object of the invention to provide an automatic sprinkler head in which a better flow of liquid is attained when the sprinkler is in operation.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which.

Figure 1:
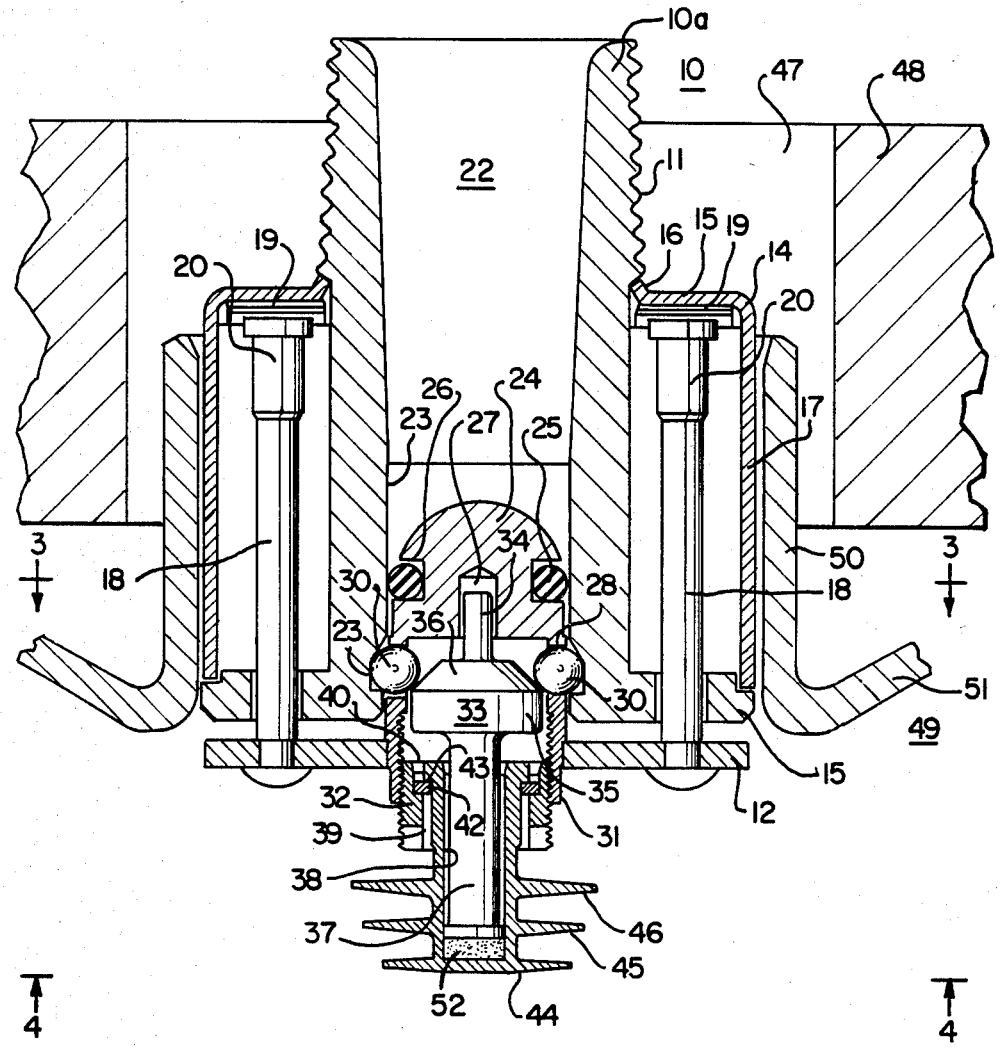
FIG. 1 is a vertical sectional view showing an automatic sprinkler in accordance with the invention in its normal position.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the sprinkler head 10, in accordance with the invention, has a body portion 10a provided with a threaded portion 11 for attachment to a supply line (not shown). A plate 12 is provided having a plurality of slotted openings 13. An outer housing 14 is provided with a rib 16 for engagement, with the lower portion of the threaded portion 11. The outer housing 14 has a cylindrical portion 17 which engages the flange 15 on body portion 10a.

Within the housing 14, a plurality of downwardly extending rod 18 are provided having springs 19 in engagement with their enlarged upper ends 20, with the interior of the housing 14, and secured at their lower ends to the plate 12. The rods 18 extend through the flange 15.

The body portion 10a has an interiorly tapered portion 22 with a cylindrical portion 23 therebelow, and within the interior of the body portion 10a an upper valve plug 24 is provided having a packing ring 25 in a groove 26. The upper valve plug 24 has a central opening 27 and a downwardly extending rim 28 with which also the cylindrical portion 23 is engaged. The lower part of the cylindrical portion 23 has a groove 29 for the reception of a plurality of locking balls 30.

The plate 12 has an internally threaded sleeve 31 secured thereto with which a lower externally threaded sleeve 32 is in engagement.

A plunger 33 is provided having an upper extension 34 extending within the opening 27 and has a central portion 35 with a tapered section 36 for retaining the balls 30 in the groove 29. The plunger 33 has a lower portion 37 slidable within an opening 38 in a cylindrical portion 39, which extends through a collar 40 and has a rim 41 which engages with a disk element 42. A rim 43 is carried by the lower externally threaded sleeve 32 and overlie element 42.

The cylindrical portion 39 has a plurality of fins 44, 45 and 46 extending outwardly therefrom, the fin 44 being of lesser diameter than the fins 45 and 46, but the fins 45 and 46 increasing in diameter in an ascending order. Fusible element 52 is provided in the lower end of portion 39 and contacts the lower end of portion 37.

A hole 47 is provided in the ceiling 48, and a cover 49 is provided having a cylindrical portion 50 with an upwardly and outwardly extending portion 51 to cover and conceal the hole 47.

Figure 2:
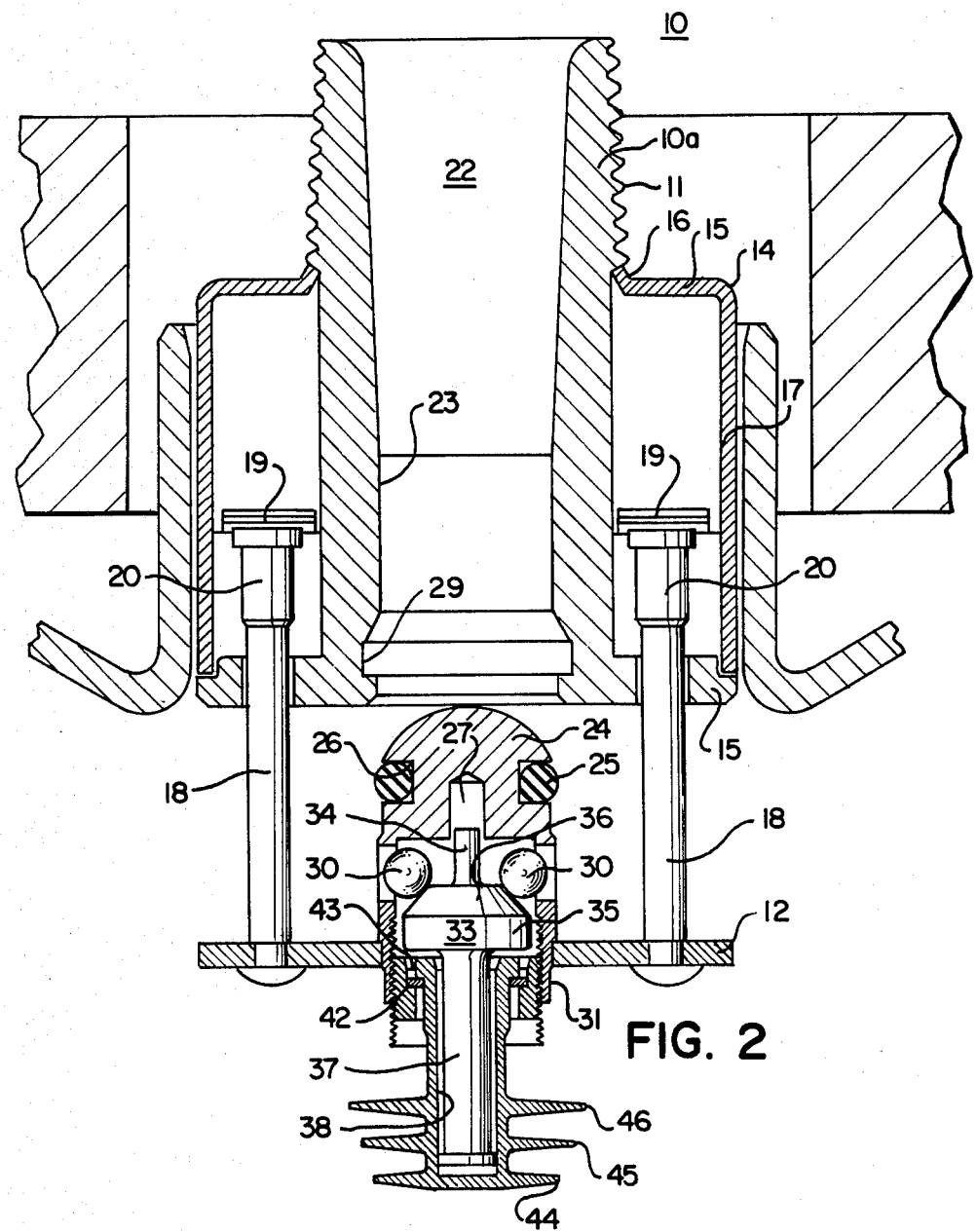
FIG. 2 is a vertical sectional view of an automatic sprinkler head in accordance with the invention in the discharge position.
Figure 3:
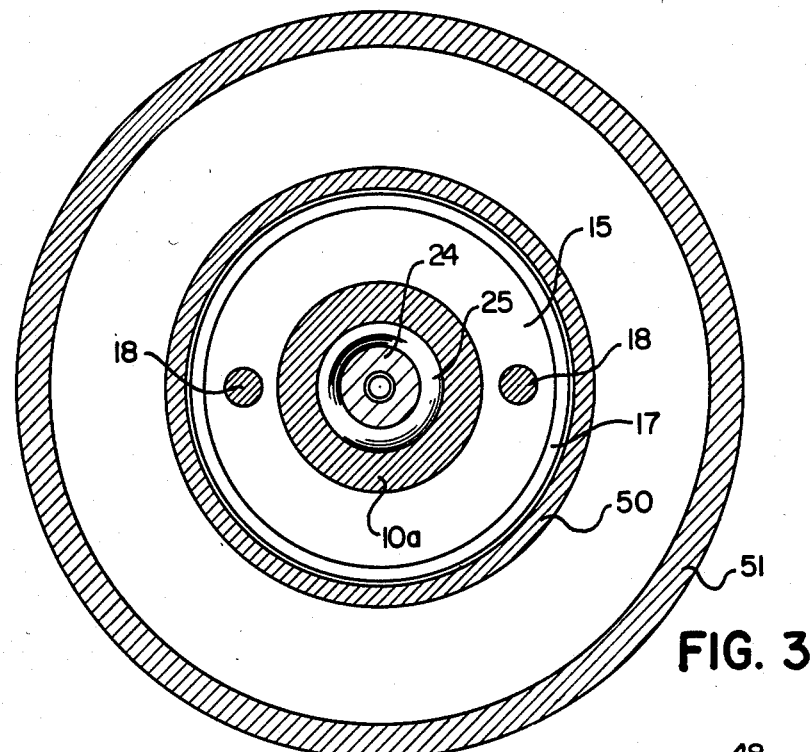
FIG. 3 is a horizontal sectional view taken approximately on the line 3—3 of FIG. 1.
Figure 4:
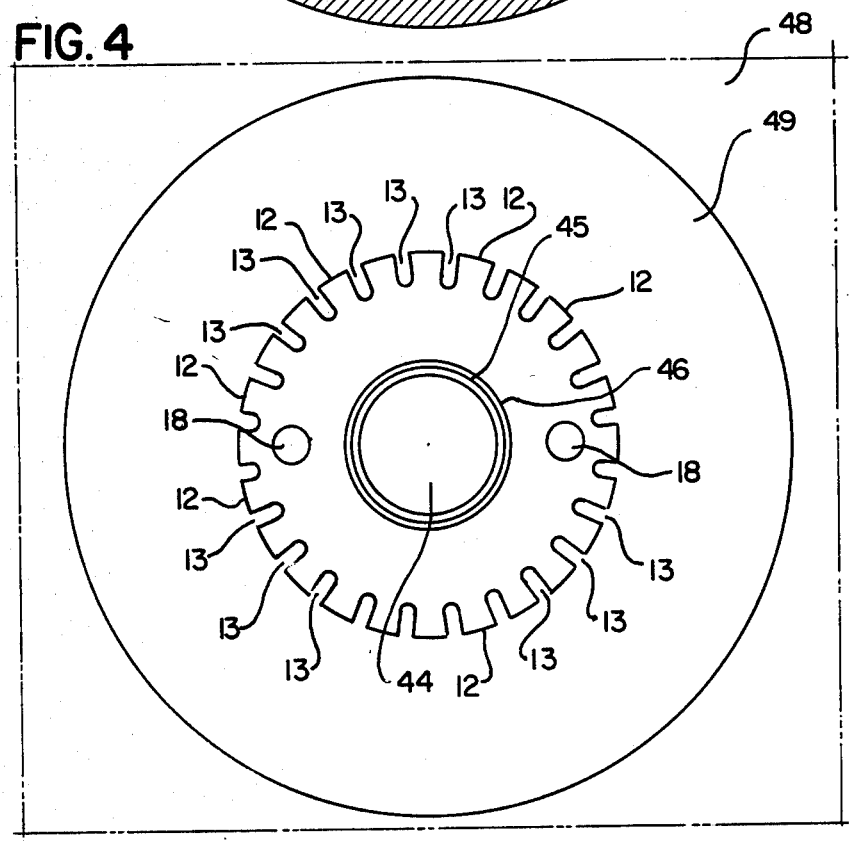
FIG. 4 is a view taken approximately on the line 4—4 of FIG. 1.

As shown in FIG. 2, upon melting of the fusible element 52, the plunger 33 drops and permits the balls 30 to move from the groove 29 and inwardly with respect to the plunger 33 and the upper valve plug 24, so that the upper valve plug 24, the plunger 33, and the cylindrical portion 39, with its fins 44, 45 and 46, move downwardly together with the plate 21, and the rods 18, urged initially by the springs 19.

I claim:

1. A temperature responsive sprinkler head comprising a hollow body having an interior chamber communicating with an inlet and an outlet, a valve plug reciprocal in said chamber with respect to said body and arranged to control flow of a flowable fire quenching material from said outlet, an actuator for said valve plug, a deflector plate having a notched periphery, means for releasably locking said plug in a position wherein it closes said outlet, temperature responsive means for enabling said actuator to release said locking means and then move with said deflector plate and valve plug to an open position of the valve plug wherein a flowable fire quenching material may exit from said outlet and impinge on said deflector plate, said chamber above said valve being unobstructed, said temperature responsive means being supported by a sleeve end wall at its lower end, the lower end of said sleeve having radially outwardly extending fins, the upper end of said sleeve being threadedly coupled to the threads on the lower end of said valve plug, and means biasing said valve plug and deflector plate to the open position of said valve plug.

2. A sprinkler head in accordance with claim 1 including a pair of rods connected to said deflector plate and guided by a flange of said body adjacent said outlet.

3. A sprinkler head in accordance with claim 2 wherein said rods each have one end affixed to said deflector plate, said reaction surface on said deflector plate being a portion of said rods.

4. A sprinkler head in accordance with claim 1 wherein said locking means includes a plunger having a tapered section between integral axially extending cylindrical extensions, one of said extensions being guided by said valve plug, the other of said extensions being guided by said sleeve, said tapered portion being disposed within a hollow interior of said valve plug and arranged to control latching members contained for movement in a direction which is radial with respect to said chamber.

5. A sprinkler head in accordance with claim 4 including a cover having an axially extending portion surrounding said body, said cover having a peripheral flange extending upwardly and outwardly with respect to the lower end of the axially extending portion for overlying a hole in a ceiling.

6. A temperature responsive sprinkler head comprising a hollow body having an interior chamber communicating with an inlet and an outlet, a valve plug reciprocal in said chamber with respect to said body and arranged to control flow of water from said outlet, an actuator for said valve plug, a water deflector plate having a notched periphery, means for releasibly locking said plug in a position wherein it closes said outlet, temperature responsive means for enabling said actuator to release said locking means and then move with said deflector plate and valve plug to an open position of the valve plug wherein water may exit from said outlet and impinge on said deflector plate, said chamber above said valve plug being unobstructed, and spring means extending between a reaction surface on said body and said deflector plate for biasing said valve plug and deflector plate to the open position of said valve plug, a pair of rods connected to said deflector plate and guided by a flange of said body adjacent said outlet, said rods each have one end affixed to said deflector plate, said reaction surface on said deflector plate being a portion of said rods, a sleeve having threads on its upper end and being closed by an end wall on its lower end, said temperature responsive means being supported by said sleeve end wall, the lower end of said sleeve having radially outwardly extending fins, the upper end of said sleeve being threadedly coupled to threads on the lower end of said valve plug.

* * * * *